3,709,820
SOLID ELECTROLYTE

Susumu Yoshimura, Shirow Asakawa, and Katsue Hasegawa, Osaka, Japan, assignors to Matsushita Electric Industrial Company, Limited, Kadoma City, Osaka, Japan
No Drawing. Filed Feb. 25, 1971, Ser. No. 119,058
Claims priority, application Japan, Mar. 4, 1970, 45/18,894; Mar. 5, 1970, 45/19,141
Int. Cl. H01g 9/02
U.S. Cl. 252—62.2  3 Claims

ABSTRACT OF THE DISCLOSURE

An ionically conductive organic solid material is provided, which is useful for an electrolyte for electric devices. The material is a crystalline electron donor-acceptor complex comprising ionic crystals composed of 7,7,8,8-tetracyanoquinodimethane, an aromatic diamine, and a liquid impregnated in the lattices of the ionic crystals so that the material has the excellent ionic conductivity suitable for an electrolyte.

---

This invention relates to electrolytes and more particularly to ionic conductive organic solid electrolytes and the manufacture thereof.

There are known various types of ionic conductive solid materials, one of which is an inorganic halide such as alkali metal halide, silver halide and alkali earth metal halide. None of these materials are utilized for an electrolyte for a capacitor etc., since all these materials have such low conductivities as to be virtually regarded as insulators at normal temperatures. Another type of the known ionic conductive materials is a ternary glass material such as Ag-I-Hg which has recently been developed. This new material has low resistivity as low as about 100 $\Omega$cm. Difficulty is, however, encountered in building up a high temperature and precisely controlling the ambient temperature when producing the ternary glass material referred to above.

It is therefore an object of this invention to provide a novel ionic conductive solid electrolyte which is easily and economically manufactured.

Another object of this invention is to provide a novel ionic conductive solid electrolyte which has a sufficiently large ionic conductivity.

Another object of this invention is to provide a method for manufacturing such an electrolyte as above mentioned.

This invention employs the ionic conductivity of an electron donor-acceptor (EDA) complex including 7,7,8,8-tetracyanoquinodimethane (TCNQ) as an acceptor and an aromatic diamine as a donor.

As is well known a TCNQ molecule is a large and plain molecule which has such a great electron affinity that when mixed or melted with another molecule, the TCNQ molecule takes an electron from and is united with the other molecule so as to produce an electron donor-acceptor crystalline complex as a whole. The crystals of the electron donor-acceptor complex may be either ionic or neutral depending upon the magnitude of the ionization potential of the opposite molecule. When the opposite molecule has a relatively small ionization potential, the TCNQ molecule traps the electron of the opposite molecule and ionically bonds with the opposite molecule.

Such EDA complexes as above mentioned have thus far been regarded as electronically conductive materials. However, it is important that the EDA complexes have prominent ionic conductivities in addition to their electronic conductivities.

Examples of the molecules having small ionization potentials are those containing an aromatic diamine, substituted ammonium ion, aromatic onium ion and metallic ion. The EDA complexes composed of the TCNQ and such molecules above-exemplified have ionic conductivities of several percent of their total conductivity. It is, however, desired that a highly ionic conductive EDA complex be used for electrolytes.

According to this invention, an ionic conductive EDA complex is provided, which has an increased ionic conductivity. This EDA complex is an organic ternary material comprising ionic crystals of the TCNQ acceptor and an aromatic diamine donor, and a solvent as liquid of constitution impregnated in the lattices of the ionic crystals analogously to crystal water or water of constitution.

The EDA complex of this invention may be manufactured by various methods but in accordance with this invention, such is manufactured advantageously in a method which comprises reacting the TCNQ with an approximately equimolecular amount of the aromatic diamine in a sufficient amount of a solvent. If it is desired to increase the amount of the solvent impregnated within the crystal lattices of the EDA complex, another method is provided, which comprises reacting the TCNQ and the aromatic diamine in the presence of chloroform for producing dark green crystals, filtering the resultant crystals, dissolving the filtered crystals in the solvent, and recrystallizing the resultant solution.

The EDA complex manufactured by the above-disclosed methods includes a sufficient amount of solvent within its crystal lattices so that the EDA complex has a prominent ionic conductivity suitable for an electrolyte.

The ionic conductivity of the EDA complex according to the invention is ascertained and measured by:

(1) Contacting a needle of electrode metal of aluminum or tantalum on a subject material in a crystal or pellet form and applying a positive potential to the needle relative to the subject material while observing the current through the needle, wherein if the ionic conductive phenomena occurs within the subject material, the current through the needle rapidly decreases due to anodic oxidization of the needle by the ionic conduction; or (2) Pressing a metal element or foil of aluminium, magnesium or calcium onto the subject material while observing the electromotive force between the metal and the subject material, wherein if a stable electromotive force is built up, then it is known that ionic conduction is present.

The following representative examples illustrate in some degree the scope of the invention. It will be seen that EDA complexes prepared in a preferred method according to the invention exhibit ionic conductivities which are several ten percent of the total conductivity. Such conductivities are greater than any of those achieved by the known art.

EXAMPLE I 1.8 gr. of benzidine and 2 gr. of TCNQ were dissolved in 1 liter methylenechloride. The mixture was boiled for 2 hours and thereafter maintained at a normal temperature for 12 hours. The resultant crystals were filtered to obtain green crystals. The resistivity and ionic conductivity of the green crystals were 100–1000 $\Omega$cm. and 10%, respectively. The proportion of the donor, acceptor and solvent of the green crystals was about 1:1:1.

EXAMPLE II p-Phenylenediamine and the TCNQ were dissolved in the presence of chloroform and the solution was crystallized so as to produce dark green crystals which had a resisitivity of 1000 $\Omega$cm. On the other hand, when p-phenylenediamine and the TCNQ were dissolved in dimethylformamide, the resultant crystals had a resistivity and ionic conductivity of about 500 Ωcm. and 50%, respectively.

EXAMPLE III

Benzidine and the TCNQ, approximately equimolecular to each other, were reacted in the presence of chloroform so as to produce benzidine-TCNQ. 5 gr. of the benzidine-TCNQ was dissolved in 500 ml. of acetonitrile. The resultant solution was refluxed in the presence of about 2 gr. of activated carbon at 80° C. for about 4 hours and thereafter the resultant solution was filtered while the ambient temperature was maintained at about 80° C. The filtered resultant product was maintained at a normal temperature for 20 hours so as to produce dark violet crystals which had a resistivity of $10^3$ to $10^4$ Ω cm. and ionic conductivity of 0.1 to 5%.

EXAMPLE IV p-Phenylenediamine and the TCNQ approximately equimolecular to each other were reacted in the presence of chloroform so as to produce p-phenylenediamine-TCNQ which had a resistivity of $4 \times 10^3$ Ω cm. 10 gr. of the p-phenylenediamine-TCNQ was dissolved in 200 ml. of N-methylacetoamide. The resultant solution was refluxed in the presence of activated carbon for 4 hours, and thereafter the resultant solution was filtered. The filtered resultant product was maintained at 0° C. for 20 hours so as to produce black crystals which had a resistivity of 100 Ω cm. and an ionic conductivity of 50%.

EXAMPLE V

Diethyl-p-phenylenediamine-TCNQ was produced in the same manner as Example IV, which had a resistivity of $3 \times 10^3$ Ω cm. 10 gr. of the diethyl-p-phenylenediamine-TCNQ was dissolved in 200 ml. of dimethylformamide. The resultant crystals obtained in the same manner as Example IV had a resistivity of 95 Ω cm. and an ionic conductivity of 40%.

What is claimed is:
1. A solid electrolyte consisting essentially of the electron donor-acceptor crystalline complex of 7,7,8,8-tetracyanoquinodimethane and an aromatic diamine, and a liquid impregnated within the lattices of said crystalline complex, said liquid being selected from the group of polar solvents consisting of nitriles and amides and being in an amount sufficient to improve the ionic conductivity of said crystalline complex.
2. A method of manufacturing the solid electrolyte defined in claim 1, comprising reacting 7,7,8,8-tetracyanoquinodimethane with an amount of aromatic diamine equimolecular to said 7,7,8,8-tetracyanoquinodimethane in the presence of chloroform as reaction medium, recovering resultant crystalline complex from said chloroform, dissolving said crystals in a solvent selected from the group consisting of nitriles and amides and recrystallizing said solid electrolyte from said solvent.
3. A method according to claim 2, wherein said aromatic diamine is selected from the group consisting of benzidine and paraphenylenediamine.

References Cited

UNITED STATES PATENTS 3,483,438  12/1969  Sharbaugh _____ 252—62.2 X

OTHER REFERENCES

Melby et al.: J. Am. Chem. Soc., vol. 84, p. 3374–87, September 1962.

JAMES E. POER, Primary Examiner

J. COOPER, Assistant Examiner

U.S. Cl. X.R.

136—153; 317—230